UNITED STATES PATENT OFFICE.

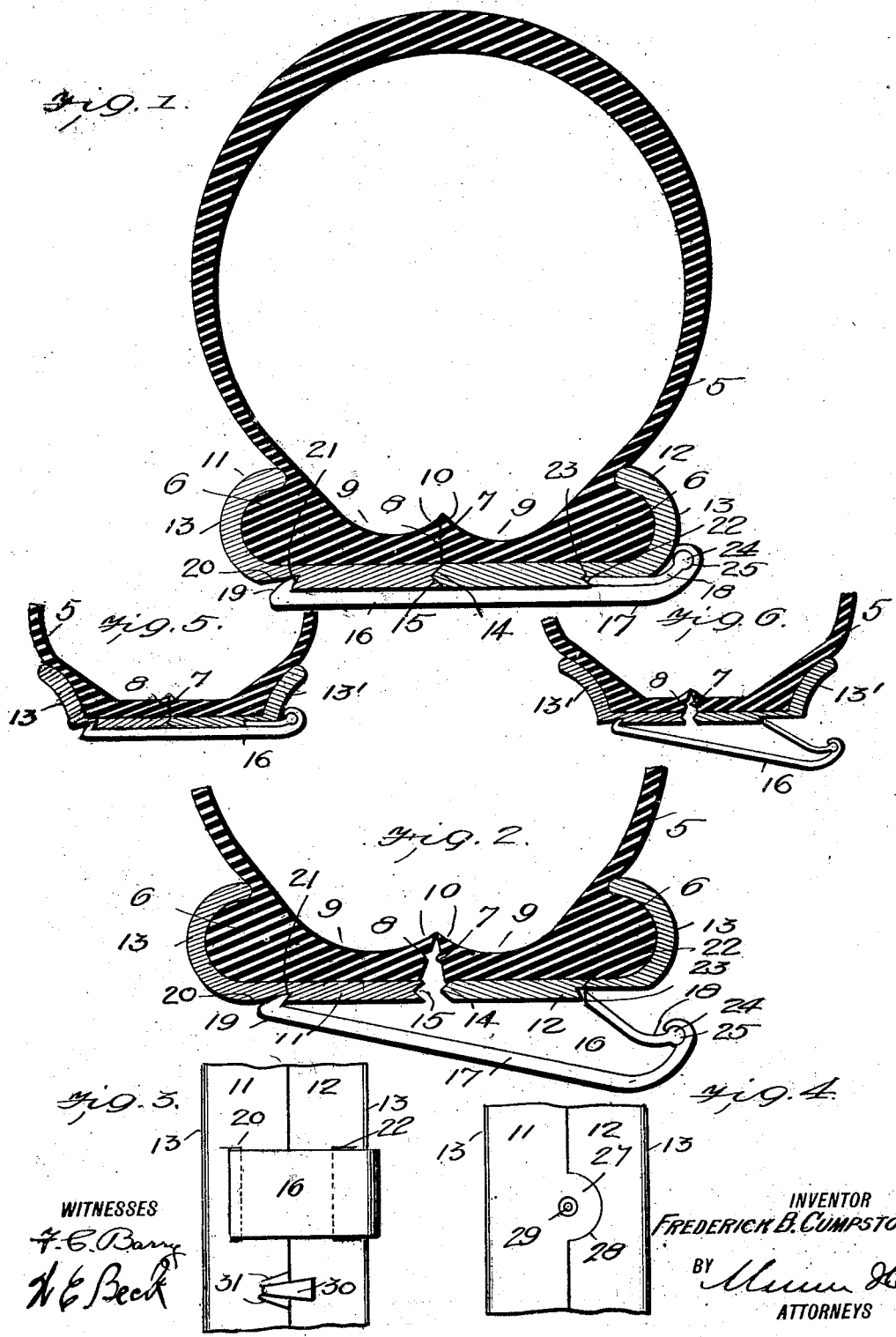

FREDERICK B. CUMPSTON, OF BLOOMING GROVE, TEXAS.

TUBELESS TIRE AND RIM AND LOCK THEREFOR.

1,282,197. Specification of Letters Patent. Patented Oct. 22, 1918.

Application filed February 27, 1917. Serial No. 151,241.

*To all whom it may concern:*

Be it known that I, FREDERICK B. CUMPSTON, a citizen of the United States, and a resident of Blooming Grove, in the county of Navarro and State of Texas, have invented a certain new and useful Improvement in Tubeless Tires and Rims and Locks Therefor, of which the following is a specification.

One of the principal objects of my present invention is to provide an improved tubeless pneumatic tire casing, and an improved rim and locking means therefor, whereby to effectively draw the edges of the tire casing together to render the same air tight.

Another object of the invention is to provide a tubeless tire casing having an improved joint or seam upon which the pressure of the air within the casing will act to assist in retaining an air tight joint between the edges of the casing.

A further object of the invention is to provide an improved device of the class described, which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing, in which like characters of reference indicate like parts throughout the several figures, of which—

Figure 1 represents a view in section taken transversely through a tire casing and rim and lock therefor, showing the casing in closed position;

Fig. 2 represents a similar view showing the position of the rim and locking device before the latter is drawn upwardly for locking the casing in air tight position;

Fig. 3 represents a plan view of a portion of the under face of the rim and lock;

Fig. 4 represents a plan view of the portion of the rim, looking at the under face thereof, through which the valve for inflating the tire casing extends;

Fig. 5 represents a view similar to Fig. 1, illustrating an arrangement in which a plain non-clencher rim is used;

Fig. 6 represents a view similar to Fig. 2, illustrating the use of the non-clencher rim.

Referring more particularly to the drawing, the tire casing is indicated at 5, and in the embodiment shown in Figs. 1 and 2, the casing is provided with the usual clencher beads 6. The tire is divided centrally around its base, and the face of one of the abutting edges of the tire base is provided with a continuous substantially V-shaped rib 7 adapted to fit when the tire is in closed position, into a V-shaped groove 8 provided in the opposing face of the tire base, as indicated clearly in Fig. 1.

The interior surface of the tire along its base portion is hollowed or concaved, on both sides of the joint, as at 9, and the surfaces adjacent the abutting faces of the tire base incline downwardly as at 10, whereby when air is pumped into the tire casing, the pressure of the air will serve to force the abutting faces of the tire together, whereby to aid in establishing an air tight joint between the abutting surfaces of the tire base. The same principle of construction is carried out in the form of tire casing shown in Figs. 5 and 6, which form is devoid of the clencher beads 6.

I use a divided rim in connection with the tubeless tire casing, and in the form shown in Figs. 1 and 2, the rim consists of the sections 11 and 12 provided at their outer edges with the continuous clencher bead engaging hooks or flanges 13, adapted to engage the clencher bead 6 of the tire casing, for securing the casing in position. One of the rim sections is provided with a V-shaped continuous tongue or rib 14 on its inner edge, adapted to fit when the rim sections are drawn together, into a substantially V-shaped groove 15 formed in the inner edge of the opposite rim section.

The rim sections are adapted to be drawn together and secured in closed position, by a suitable number of locks, indicated generally at 16, which are placed at suitably spaced points around the inner surface of the rim. Each of the locks includes a base plate 17 and a locking plate 18. The base plate extends transversely of the rim across the inner face thereof, and at one end is provided with a transverse beveled hook or tooth 19 adapted to engage in a recess 20 cut in the under surface of one of the rim sections at the base of its clencher flange 13. This recess 20 defines an undercut shoulder 21 against which the hook or tooth 19 engages. The other rim section is similarly recessed to provide an undercut shoulder 22 against which the beveled inner end 23 of the locking plate is adapted to engage.

This locking plate is much shorter than the base plate 17, and at its outer end is provided with a transverse bead 24 which rotatably fits in a transverse socket 25 formed in the adjacent end of the base plate 17. This end 26 of the base plate curves around the bead 24 sufficiently to prevent detachment of the bead from the socket. The adjacent portions of the base plate and locking plate are curved outwardly sufficiently to conform with the curvature of the adjacent portion of the rim.

The construction of the rim shown in Figs. 5 and 6, and of the lock shown therein, is the same as already described, with the exception that the rim in this instance is provided with concavo-convex outwardly turned flanges 13', instead of the hooked clencher flanges 13, such flanges 13' engaging against the concaved lateral surfaces of the tire base to hold the same in position on the rim.

One of the rim sections is provided at a suitable point, with an ear 27 which projects from the inner edge of the rim section into a similarly shaped recess 28, formed in the opposite section. This ear 27 is provided with an opening 29 through which a valve tube for inflating the tire casing projects.

As illustrated in Fig. 3, one of the rim sections carries on its under surface a lug 30 underlying the opposite rim section and projecting between two spaced retaining lugs 31, whereby to prevent circumferential movement of one rim section relatively to the other.

In locking the rim sections together, the parts being positioned as indicated in Fig. 2, the lock is pressed upwardly, whereby the tooth 19 on the base plate will coact with the beveled edge 23 of the locking plate in drawing the sections of the rim together. The final position of the parts is indicated in Fig. 1, from which it will be seen that the rim sections are in tightly locked position, the rib 14 of one section fitting snugly into the groove 15 of the other section throughout the entire circumference of the rim.

It will be noted from Figs. 2 and 4, that the opposing edges of the tire base, before the rim has been locked, are slightly undercut or beveled to converge toward each other, the apices of the thickened portions formed at the abutting edges of the base being in contact. When the rim sections are drawn together, the opposite faces of the tire base will be forced firmly one against the other to take the final position indicated in Fig. 1, the resiliency of the material of which the base is formed serving, in attempting to force the material of the tire into normal position, to aid the air pressure within the casing, and the action of the rim sections when in locked position, in effecting an air tight joint between the portions of the tire base.

Although I have described the preferred embodiment of my invention, I may desire to make such changes in the construction, combination, and arrangement of parts thereof, as do not depart from the spirit of the invention, and the scope of the appended claim.

I claim:—

The combination of a tire having its base divided along its median line, a rim divided also along its median line and having sections engaging and supporting the sections of the base of the tire, whereby to equally apportion the strain of the parts, and means for drawing the rim sections together to connect the same, the abutting edges of the base sections of the tire and of the said rim sections having relatively engaging ribs and recesses the former to constitute a fluid-tight joint in the connected position and the latter to protect the joint so formed.

FREDERICK B. CUMPSTON.